Oct. 4, 1932.    W. E. MOORE    1,881,089

METAL COATING APPARATUS

Original Filed Oct. 11, 1929

William E. Moore
Inventor

By
Attorney

Patented Oct. 4, 1932

1,881,089

UNITED STATES PATENT OFFICE

WILLIAM E. MOORE, OF PITTSBURGH, PENNSYLVANIA, ASSIGNOR TO PITTSBURGH RESEARCH CORPORATION, OF PITTSBURGH, PENNSYLVANIA

METAL COATING APPARATUS

Original application filed October 11, 1929, Serial No. 398,989. Divided and this application filed February 7, 1931. Serial No. 514,251.

My invention relates to apparatus for carrying out processes for coating metal.

There is a large demand for wire, rods, tubes and sheets covered with a non-corrosive metal such as copper, but this demand has not been completely supplied due to the fact that the apparatus and processes heretofore employed resulted in unequal covering or insufficient adherence of the non-corrosive metal to the steel or other metal, or an eccentric or irregular thickness of the covering metal. Numerous apparatus and methods of welding the copper to the steel billet have been employed but these apparatus and processes have been both expensive and uncertain. Some of these apparatus and methods involved heating the steel billets in the molds which resulted in damage to the molds and in uncertain welding and an uneven covering of copper.

I propose to avoid these disadvantages by electrically heating the billet either in the mold or separately from the mold and thus assure even heating and welding of the covering of copper or other metal.

A further object of my invention is to prevent oxidation of the metals during the welding thereof.

Other objects and advantages of my invention will be apparent during the course of the following description.

This application is a division of my application filed October 11, 1929, Serial No. 398,989.

Figure 1:
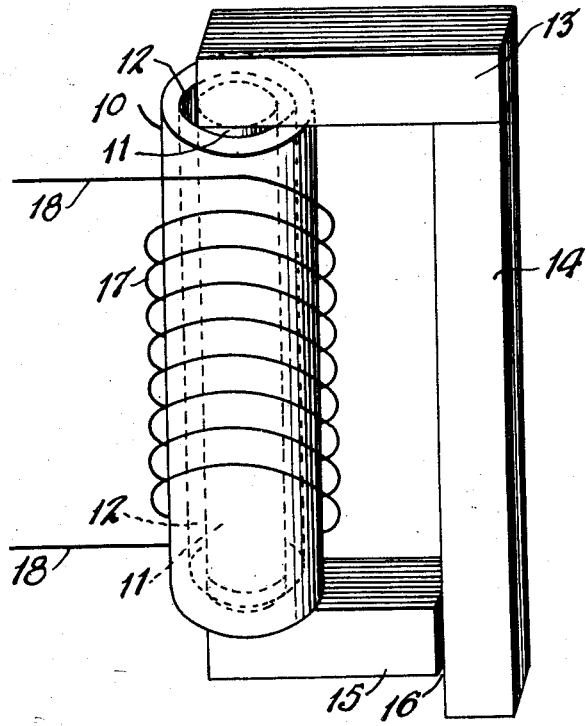
Figure 2:
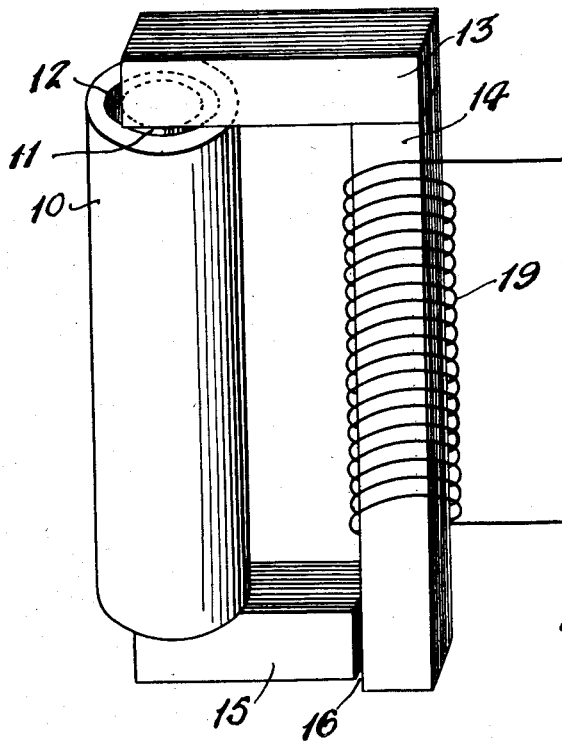

In the accompanying drawing, which forms a part of this specification and wherein like characters of reference denote like or corresponding parts throughout the same, Figure 1 is a diagrammatic representation of my improved coating apparatus, and Figure 2 is a similar view of a modified form thereof.

In the drawing wherein for the purpose of illustration is shown a preferred embodiment of my invention, the numeral 10 designates a cylindrical mold of metal or suitable refractory material, open at its upper end. The billet 11 of steel or other corrosive material is placed within the mold 10, concentrically therewith, and being smaller than the interior of the mold, leaves a circumferential space 12 between the mold and the billet and extending throughout the length of the billet. The steel billet 11 is arranged longitudinally in a magnetic circuit formed by a laminated core built up of low hysteretic loss laminated iron such as high silicon steel sheets arranged as in transformer cores. The laminated core comprises a transverse top bar 13 connected with a longitudinal bar 14 arranged parallel to the billet 11. The top bar 13 rests upon the top of the steel billet 11 and a lower transverse bar 15 contacts with the lower end of the billet through a suitable opening in the bottom of the mold 10 in any suitable manner, but is not secured directly to the bar 14 as is the bar 13. A slip joint, shown diagrammatically at 16, is arranged between the end of the bar 15 and the bar 14. Consequently the space between the cross bars 13 and 15 may be varied to accommodate differences in the sizes of the billets to be coated. A coil comprising an alternating current winding 17 is arranged around the billet or mold and when the current is applied through the leads 18 the magnetic circuit is closed around the outside by the laminated core sections 13, 14 and 15.

In place of arranging the coil about the billet or mold as in Figure 1, the billet may be heated by means of a primary winding or induction coil supplied by alternating current and surrounding a portion of a laminated core as at 19 in Figure 2.

The magnetic circuit then passing through the billet, which is not laminated, causes it to act as a magnetic core and also as a secondary element of the transformer combination, the non-laminated material of the billet allowing circumferential currents to flow around steel from end to end, bringing it up rapidly to the proper heat.

The billet is properly arranged in the mold while cold or the mold may be applied after heating the billet and the electric current turned on, the effect being to rapidly heat the billet. The copper or other metal such as a non-corrosive material is separately melted and then is poured into the open top of the mold and fills up the space 12. It is obvious that the mold may thus be heated by the billet before the copper is poured. The heating of the steel billet is clean non-scaling heat, such as to produce proper welding of the copper to the steel since the ordinary oxidizing effects of the fuel fired furnaces are largely eliminated due to the absence of hot furnace gases and also due to the very rapid heating of the billet by my electrical process.

In order to keep down the oxidation and improve the welding properties of the steel to the copper, I preferably enclose the billet, while being heated, in a bath of reducing or non-oxidizing gas, as for example, hydrogen, water-gas, or other similar fluids.

It has been found that billets covered by this process are evenly molded and completely welded and are not expensive to produce.

While I have shown and described the preferred embodiment of my invention, it is to be understood that various changes may be resorted to without departing from the spirit of my invention or the scope of the subjoined claims.

What I claim and desire to protect by Letters Patent is:

1. Apparatus for coating a billet of corrosive metal with a non-corrosive metal comprising a mold member open at both ends and adapted to receive a billet, a laminated magnetic core member adapted to contact with both ends of the billet, and an alternating current coil associated with one of said members to excite a magnetic flux longitudinally of the billet to heat the same.

2. Apparatus for coating a billet comprising a mold open at both ends and adapted to receive a billet, a laminated iron core adapted to contact with the billet at both ends thereof, and an alternating current coil arranged about the mold and adapted to excite a magnetic flux longitudinally of the billet to heat the same.

3. Apparatus for coating a metal billet comprising a mold open at both ends and adapted to receive a billet, a laminated iron core adapted to contact with the ends of the billet, and an alternating current coil surrounding a portion of the laminated core and adapted to excite a magnetic flux longitudinally of the billet to heat the same.

4. Apparatus for coating a metal billet comprising a mold member open at both ends and adapted to receive a billet, a laminated iron core member adapted to contact with the ends of the billet, said core being extensible to insure contact with the ends of the billet, and an alternating current coil associated with one of said members to excite a magnet flux longitudinally of the billet to heat the same.

5. Apparatus for coating a steel billet comprising a mold of refractory material open at both ends and adapted to receive a billet, a laminated iron core adapted to contact with the ends of the billet, said core comprising a longitudinal section arranged substantially parallel to and spaced from the billet and transverse core sections adapted to contact with the ends of the billet, one of said transverse sections having an adjustable connection with the longitudinal section, and an alternating current coil arranged about said mold to excite a magnetic flux longitudinally of the billet to heat the same, the mold being heated by the billet.

6. Apparatus for coating a steel billet comprising a mold open at both ends and adapted to receive a billet, a laminated iron core comprising a longitudinal section arranged substantially parallel to and spaced from the billet and transverse core sections adapted to contact with the ends of the billet, one of said transverse sections having an adjustable connection with the longitudinal core section, and an alternating current coil surrounding one of said core sections to excite a magnetic flux longitudinally of the steel billet to heat the same, the mold being heated by the billet.

In testimony whereof I affix my signature.

WILLIAM E. MOORE.